United States Patent [19]

Breher

[11] 4,083,838

[45] Apr. 11, 1978

[54] METHOD OF PRODUCING IN A CONTINUOUS OPERATION ENDLESS TOOTHED BELTS OF ANY DESIRED CIRCUMFERENTIAL LENGTH

[75] Inventor: Rudolf Breher, Porta Westfalica, Germany

[73] Assignee: BRECO Kunststoffverarbeitungs-GmbH & Co. KG, Porta Westfalica, Germany

[21] Appl. No.: 786,963

[22] Filed: Apr. 12, 1977

[30] Foreign Application Priority Data

Apr. 13, 1976 Germany .......................... 2616177

[51] Int. Cl.² ............................................ B29D 29/00
[52] U.S. Cl. ............................... 264/145; 156/138; 156/140; 264/151; 264/229; 264/231; 264/281
[58] Field of Search .............. 264/145, 151, 163, 229, 264/280, 281, 231; 156/137, 138, 140, 141; 425/115

[56] References Cited

U.S. PATENT DOCUMENTS

| 1,415,929 | 5/1922 | Grosvenor | 264/231 |
| 2,195,125 | 3/1940 | Smith | 156/141 X |
| 2,393,058 | 1/1946 | Pierce | 264/281 X |
| 3,152,204 | 10/1964 | Sauer | 264/231 |
| 3,761,558 | 9/1973 | Hnatek | 264/231 |
| 3,793,426 | 2/1974 | Ritchie | 264/231 |
| 3,799,824 | 3/1974 | Arnao | 156/141 X |
| 3,860,684 | 1/1975 | Vance | 264/231 X |
| 3,894,901 | 7/1975 | Breher | 156/137 X |

FOREIGN PATENT DOCUMENTS

| 1,253,907 | 11/1967 | Germany | 156/137 |
| 458,343 | 3/1970 | Japan | 156/140 |

Primary Examiner—Richard R. Kucia
Attorney, Agent, or Firm—Walter Becker

[57] ABSTRACT

A continuous process for making endless toothed belts using a reinforced toothed belt preform of indefinite length by spirally winding the preform around toothed wheels spaced a variable distance while fusing the spiral wraps into a belt tube. One of the wheels forms a closed arc shaped mold chamber sealed toward the outside by a molding belt with one end of the chamber sealingly closed by the entering length with the laterally exiting flexible length or tube advancing axially through the other end and cut to the desired width to form individual belts. The circumferential length is varied by varying the distance between the wheels. The preform can be accurately formed from an unfinished belt by fusing around the fixed radial distance supported reinforcement using wheels in cooperation with a closed chamber prior to forming the tube.

4 Claims, 4 Drawing Figures

METHOD OF PRODUCING IN A CONTINUOUS OPERATION ENDLESS TOOTHED BELTS OF ANY DESIRED CIRCUMFERENTIAL LENGTH

The present invention relates to a method of making in a continuous process endless toothed belts of any desired circumferential length from an extrudable synthetic material with a pull resistant reinforcing insert extending in the longitudinal direction of the belt.

German Offenlegungsschrift No. 2,123,902, which corresponds to U.S. Pat. No. 3,880,558 — Breher, issued Apr. 29, 1975 and belonging to the assignee of the present invention, discloses a method for producing in a continuous process through extrusion a strand-like reinforced toothed belt in any desired length. A belt section of a particular length may be cut off from this belt strand. The ends of the belt section are connected together by fusing the synthetic material in order to thus obtain a closed endless toothed belt of the desired circumferential length. However, the reinforcing inserts are not continuous where the ends of the belt are connected.

Pursuant to German Auslegesschrift No. 1,121,310, an endless reinforced toothed belt is produced by winding a strand of synthetic material of constant cross section, which strand is manufactured by continuous casting and comprises reinforcing inserts embedded therein, upon a winding core which is toothed for the formation of a toothed belt. The strand of synthetic material is wound upon the winding core in a still plasticized state so that the individual windings may be fused together during winding, thereby forming a reinforced tube or hose from which endless belts of the desired belt width may be cut off. With this method, for every desired belt circumferential length, a separate winding core which has the appropriate diameter must be provided. After the synthetic material has been cooled and solidified, the reinforced hose must be removed from the winding core. This is a difficult process. A satisfactory formation of the tooth profile is not guaranteed by the unconfined or uncontrolled winding of the continuously cast strand of synthetic material of constant cross section.

German Pat. No. 1,253,907 discloses an apparatus which comprises a vulcanizing drum and a structuring drum with variable distance between the axles. According to this patent, an endless pressure band partially winds around the vulcanizing drum, against which it is pressable. This apparatus is intended and suitable for the manufacture of endless reinforced rubber toothed belts of variable length, namely to fuse and finish vulcanize two shaped belt sections of vulcanizable rubber in respectively separate method steps, specifically, an endless belt section which comprises the reinforcing insert and has a predetermined width, and a finite belt section which comprises the belt teeth and has the same width. By turning both drums, with the endless belt section which comprises the reinforcing insert arranged thereon, the finite belt section, which comprises the belt teeth and which corresponds to the length of the encless belt section, is applied to the inner side of said endless belt section before said finite belt section rotates around the structuring drum. Subsequently, both belt sections, while passing between the vulcanizing drum and the pressure band which presses against the vulcanizing drum, are pressed together and finish vulcanized and thereby connected to one another. With this apparatus, a rubberized toothed belt of fixed width and of any desired circumferential length is intermittently vulcanizable from two prefabricated rubberized belt sections. Manufacture in a continual process is not possible with this method. Above all, it is not possible to produce with this method a toothed belt having a reinforcing insert embedded therein and comprising an extrudable synthetic material which is plasticized for the molding, that is, brought to a practically fluid state.

It is an object of the present invention to produce in a continuous process a reinforced endless toothed belt of synthetic material and of any desired circumferential length, and specifically to continuously convert a strand-like toothed belt of synthetic material, which in a suitable manner is manufactured in any desired finite length, into a closed endless belt of any desired circumferential length.

This object and other objects and advantages of the present invention will appear more clearly from the following specification in connection with the accompanying drawings in which.

Figure 1:
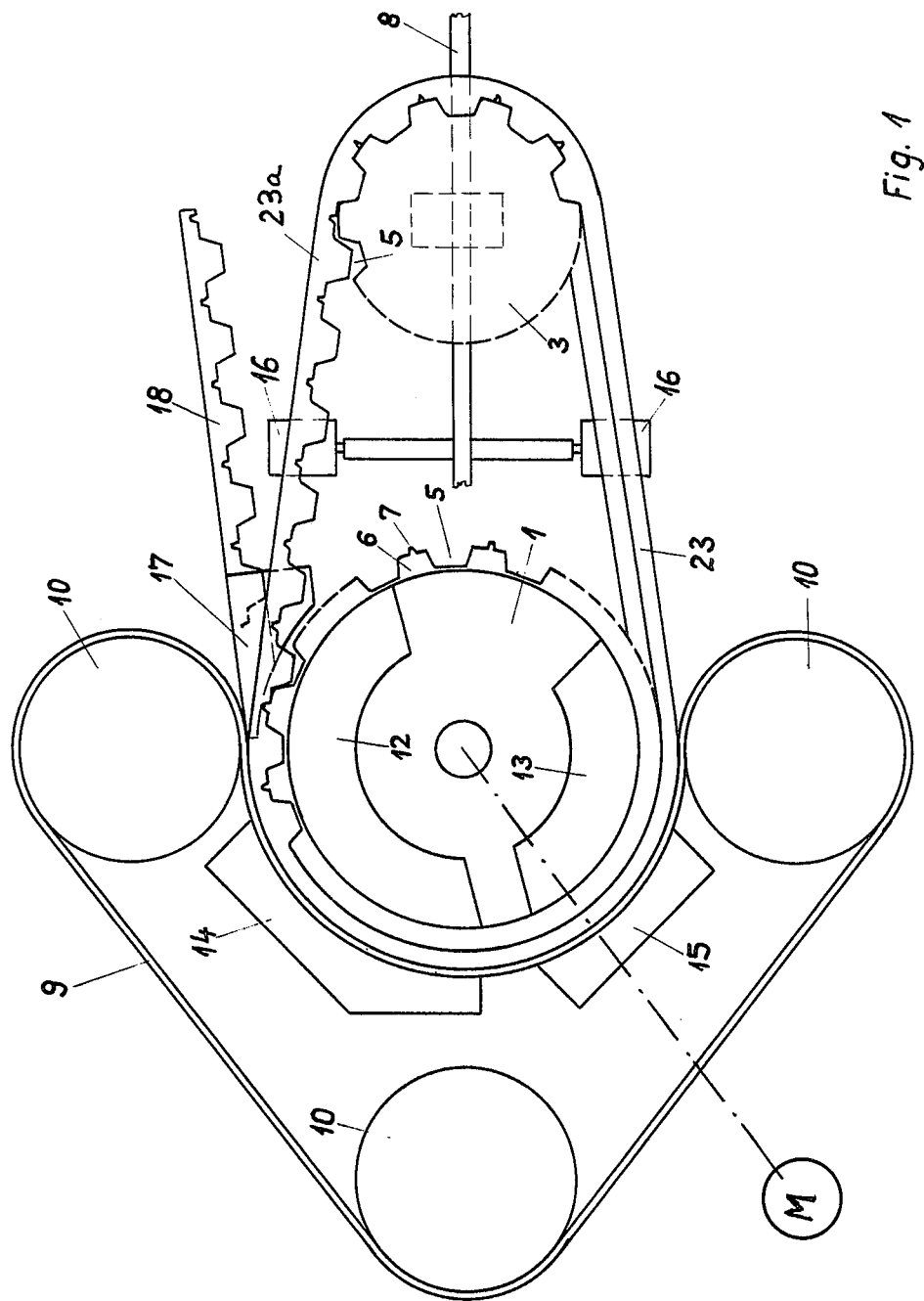
FIG. 1 is a simplified schematic side view of the apparatus for carrying out the method of the present invention.
Figure 2:
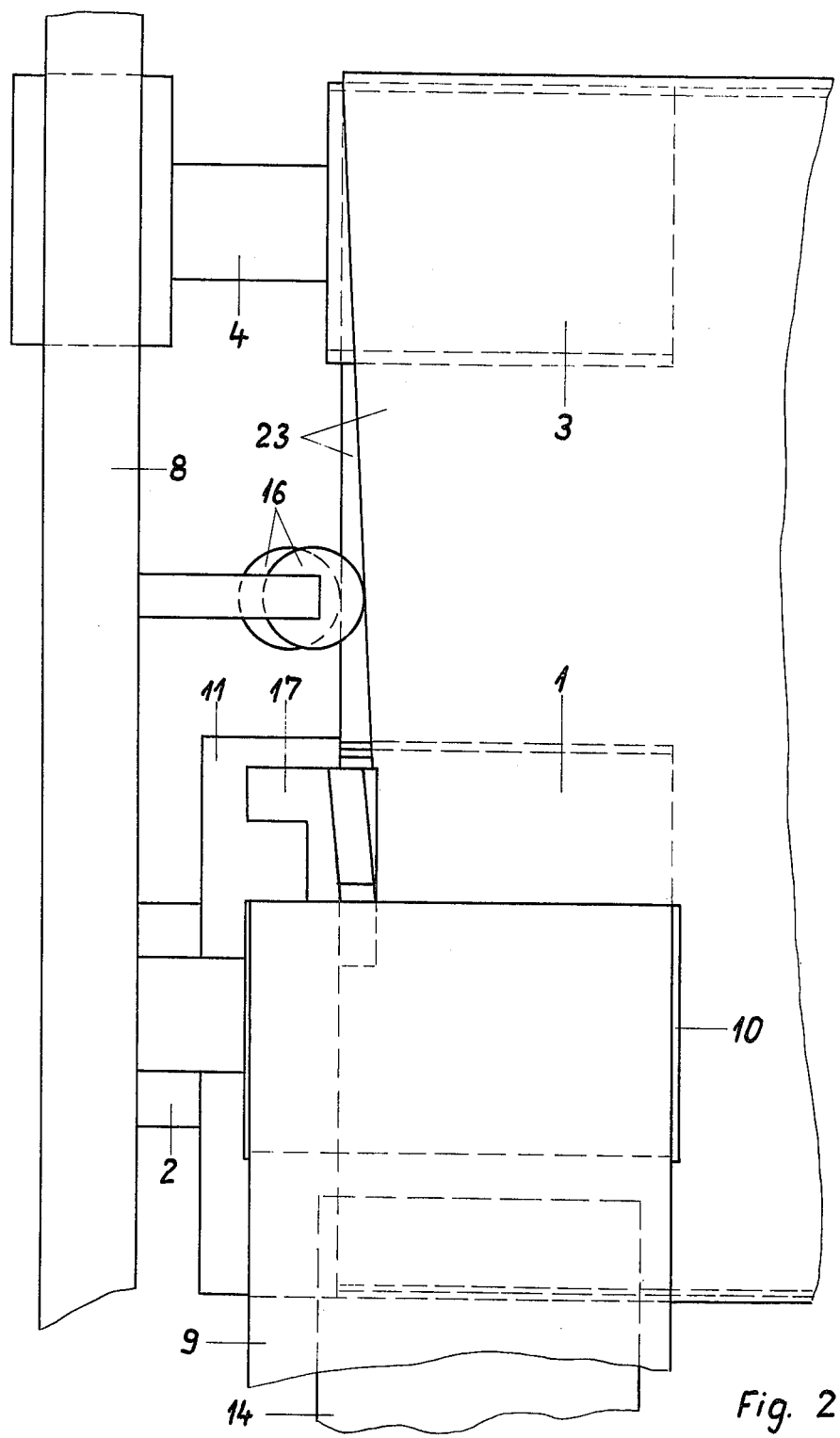
FIG. 2 is a top view of the apparatus of FIG. 1.
Figure 4:
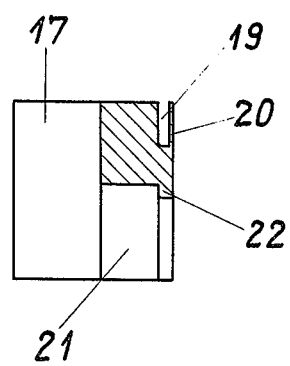
FIG. 4 is a cross section taken along the line IV—IV of FIG. 3.
Figure 3:
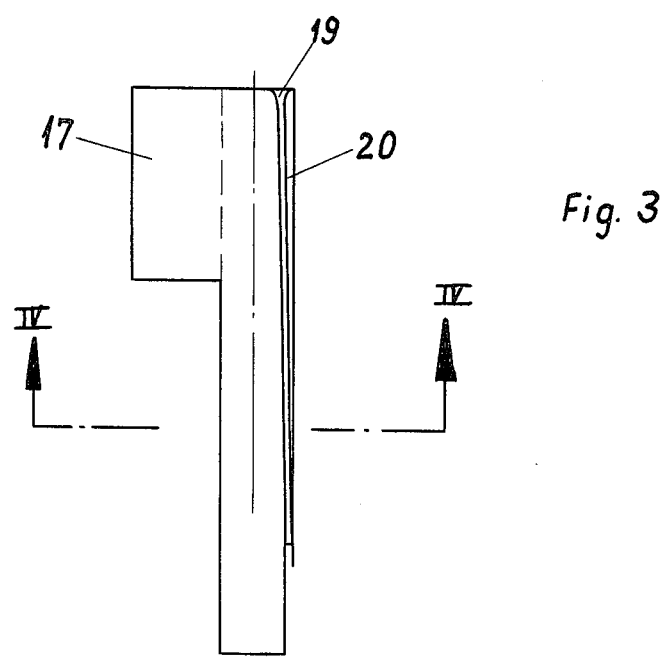
FIG. 3 is a detailed top view of a portion of the apparatus of FIG. 1 and is in larger scale than the apparatus of FIG. 1.

The method of the present invention proceeds from the process pursuant to the German Offenlegungsschrift No. 1,123,902, according to which, between a rotatable molding wheel and an endless molding belt which is partially looped around said molding wheel and advances therewith, there is formed a hollow molding chamber in the closed start of which synthetic material, such as polyurethane or polyamide, and a reinforcing insert are guided in and in which hollow molding chamber, until solidification of the synthetic material strand before the latter leaves the hollow molding chamber, the reinforcing insert is supported at a fixed radial distance from the surface of the molding wheel.

The method pursuant to the present invention is characterized primarily in that a narrow, prefabricated, unfinished belt with a reinforcing insert embedded therein is continually guided into the start of the hollow molding chamber. The method of the present invention is further characterized in that the strand of synthetic material which has a reinforcing insert embedded therein and which exits from the end of the hollow molding chamber is guided around a tensioning wheel which is spaced from the molding wheel at a distance which is dependent upon the desired circumferential length of the belt. Said strand of synthetic material, while being simultaneously deflected in the axial direction of the molding wheel in an amount approximately equal to the width of the unfinished belt, is guided back to the molding wheel and, at the side next to the hollow molding chamber, is again guided-in between the molding wheel and the molding belt, so that the hollow molding chamber, at that side which faces the returned strand of synthetic material, is directly sealingly closed off by this strand of synthetic material, while the other side of the hollow molding chamber is closed off by the molding wheel and the molding belt. The guided-in unfinished belt is softened in the hollow molding chamber by heating to such an extent that the unfinished belt is fused with that side of the returned strand of synthetic material which faces the hollow molding chamber and laterally closes off the same. Thereafter, the thus treated belt is cooled in the hollow molding chamber, thereby forming a reinforced flexible tube or hose which exits laterally out of the hollow molding chamber, rotates around the driven molding wheel and the tensioning wheel, and continuously advances on the molding wheel and the tensioning wheel in the axial direction thereof. Individual belts of the desired width are cut off from this hose or tube.

Pursuant to the method of the present invention, endless toothed belts of synthetic material with a continuous reinforcing insert and with any desired circumferential length may be produced in a remarkably economical manner. This is so because German Offenlegungsschrift No. 1,123,902 makes it possible to produce in a continuous manner and at high speeds a so-called finite unfinished belt from which, pursuant to the present invention, may be quickly and continuously produced a reinforced tube or hose of homogeneously fused synthetic material of any desired diameter, from which hose individual endless toothed belts of the desired belt width may be cut off.

The unfinished belt, immediately after being guided into the closed start of the hollow molding chamber, may be softened to such an extent that it may be fused with the returned strand of synthetic material which laterally closes off the hollow molding chamber. In this connection, until time for the cooling and re-solidification of the synthetic material prior to the strand leaving the end of the hollow molding chamber, the reinforcing insert of the unfinished belt is supported, for example by fine winding noses or projections of the molding wheel, at a radial distance from said molding wheel, i.e., in the neutral zone of the finished toothed belt. In a particularly advantageous manner, especially when producing relatively thin-walled toothed belts, the method pursuant to the present invention, by using a wide hollow molding chamber, can be carried out in such a way that a plurality of windings of the prefabricated unfinished belt are wound around the molding wheel and the tensioning wheel. Said winding is done quickly, that is, at an increased rotational speed of the molding wheel, and to begin with without softening the windings in the hollow molding chamber. The unfinished belt is wound until the hollow molding chamber is nearly filled with the windings and as long as said hollow molding chamber still remains laterally sealingly closed off from the previously produced reinforced tube or hose. Following these steps, while slowly rotating the molding wheel, all wound up windings are simultaneously heated in the hollow molding chamber and fused with one another as well as with the reinforced hose. That end of the hollow molding chamber where the fused together windings exit, and preferably that side of the hollow molding chamber closed off by the reinforced hose, are cooled. The quick winding of a plurality of windings of the prefabricated unfinished belt, and the subsequent common softening and fusing during slow turning of all windings, are periodically repeated. In this fashion a remarkably high production speed may be obtained.

In order, with the above mentioned procedure, to hold together the closely next to each other lying wound up windings of the unfinished belt also during their rotation around the tensioning wheel, the prefabricated unfinished belt, during guiding-in into the closed off start of the hollow molding chamber, may, by frictional heat or also external heat input, be expediently partially softened on that side which faces the reinforced hose and to such an extent that the unfinished belt is preliminarily connected with the reinforced hose or with the previous winding of the wound up unfinished belt prior to all windings being jointly heated and plasticized in the hollow molding chamber and being finish fused with one another.

The toothed, narrow unfinished belt, which contains one or more reinforcing inserts, may be manufactured in a number of ways. It is particularly advantageous, with the continuous and very quick manufacturing method of German Offenlegungsschrift No. 1,123,902, to produce a long finite toothed belt which contains a plurality of parallel reinforcing inserts and which toothed belt has a width which is several times as large as the width of the unfinished belt. It is further advantageous pursuant to the just mentioned publication, to cut this toothed belt, in a simple manner and parallel to its reinforcing inserts, into a plurality of individual unfinished belts, which, for feeding an apparatus for carrying out the method of the present invention, are individually wound on storage or delivery drums. Due to the higher rate of production with which unfinished belts may be produced, it is possible, with a manufacturing apparatus pursuant to the Offenlegungsschrift No. 1,123,902, to simultaneously feed a plurality of the apparatus used to carry out the method of the present invention.

Referring now to the drawings in detail, the device for carrying out the method of the present invention comprises a driven molding wheel 1 with an axle or shaft 2, and a tensioning wheel 3 with an axle or shaft 4 which is parallel to the axle or shaft 2. The molding wheel 1 as well as the tensioning wheel 3, on their circumferences, have axially extending grooves or tooth spaces 5 which, with reference to their cross sectional shape and their distance from one another in the circumferential direction of the wheels, correspond to any desired shape and tooth spacing of the teeth of a toothed belt which is to be produced. The teeth or elevation 6, formed between the grooves or tooth spaces 5 of the molding wheel 1, have on their head surfaces small rib or fin shaped winding noses or projections 7. The shaft 4 of the tensioning wheel 3 is displaceable on the support 8 of the device; thus the distance between the two shafts 2 and 4 may be adjusted in such a way that a toothed belt which is tightly wound around the molding wheel 1 and the tensioning wheel 3 has the desired circumferential length of the endless toothed belt which is to be produced. An endless molding belt 9 is wound around a portion of the circumference of the molding wheel 1. The molding belt 9 moves together with the molding wheel 1 and is guided or looped about three guide or deviating rollers 10. On one side of that portion of the molding wheel 1 which comprises the grooves or tooth spaces 5 and the teeth or elevations 6, the molding wheel 1 has a disc-shaped shoulder 11 upon which the molding belt 9 sealingly rests. The diameter of the molding wheel shoulder 11 is greater than the diameter of the toothed portion of the molding wheel 1, so that an arc-shaped intermediate space or hollow molding chamber is formed between the molding belt 9 and the toothed portion of the molding wheel 1. The radial distance between the molding belt 9 and the head surfaces of the molding wheel teeth 6 corresponds to the thickness of the belt shoulder 23a of the toothed belt which is to be produced. This intermediate space or hollow molding chamber is closed on the one side by the molding wheel shoulder 11 which cooperates with the molding belt 9, and is open on the other opposite side. A fixed heating device 12 and cooling device 13 are arranged in the molding wheel 1. A heating device 14 and a cooling device 15 are likewise arranged on the outer side of that portion of the molding belt 9 which is wound around the molding wheel 1. Those circumferential regions of the molding wheel 1 and the wound around molding belt 9, between which, as viewed in the turning direction of the molding wheel 1, the start and approximately first half of the hollow molding chamber are formed, are heatable to the plasticizing temperature of the synthetic material by the heating devices 12 and 14. The cooling devices 13 and 15 cool those circumferential regions of the molding wheel 1 and the wound around molding belt 9 between which approximately the second half and the end of the hollow molding chamber are formed. The heating devices 12 and 14 are dimensioned in the axial direction of the molding wheel 1 such that they are able to heat the intermediate space between the molding wheel 1 and the molding belt 9 up to the molding wheel shoulder 11 but preferably do not reach to the open side of the intermediate space, which open side faces away from the molding wheel shoulder 11, so that the temperature rise of the intermediate space in the region of its open side does not approach the plasticizing temperature of the synthetic material. The cooling devices 13 and 15, on the other hand, may advantageously reach from that side of the arc-shaped intermediate space which is closed off by the molding wheel shoulder 11 up to the opposite open side of the intermediate space.

A deflection or deviation device comprising rollers 16 is arranged on the support 8 between the molding wheel 1 and the tensioning wheel 3. This deflection or deviation device is adjustable in the axial direction of the molding wheel 1 by means of a non-illustrated adjusting device. A guiding or lead-in member 17 is arranged at the start of the arc-shaped intermediate space between the molding wheel 1 and the molding belt 9. The guiding or lead-in member 17 serves to guide a narrow unfinished belt 18 into the intermediate space. For this purpose the guiding or lead-in member 17 has a grooved guiding channel 19, the width of which corresponds to the width of the unfinished belt 18 which is to be guided in. The guiding channel 19 leads directly onto the radial side flank of the molding wheel shoulder 11 contiguous to the intermediate space. That side wall 20 of the guiding channel 19 which faces away from the molding wheel shoulder 11 tapers off toward the exit end of the guiding channel 19. The underside of the guiding or lead-in member 17 has an arc-shaped recess 21 which is engaged by the molding wheel shoulder 11. With an arc-shaped rib 22, the underside of the guiding or lead-in member 17 reaches as far as the circumference of that portion of the molding wheel 1 which is provided with the grooves or tooth spaces 5 and the teeth or elevations 6. The width of this rib 22 corresponds to the width of the unfinished belt 18 which is to be guided in.

The operation of the device for carrying out the method of the present invention is as follows: Upon the shafts 2 and 4 are arranged a molding wheel 1 and a tensioning wheel 3, the toothing of which need only correspond to the tooth shape and tooth spacing of the toothed belt which is to be produced. The distance of the molding belt 9 from the toothed portion of the molding wheel 1, i.e., the desired thickness of the belt shoulder 23a of the toothed belt which is to be produced, may be fixed, for example, by using a disc-shaped molding wheel shoulder 11 which is separate from the toothed portion of the molding wheel 1. The desired circumferential length of the endless toothed belt which is to be produced is predetermined in conformity with the adjustment of the distance between the shafts 2 and 4. A narrow unfinished belt 18, which has one or more reinforcing inserts, is prefabricated in any long finite shape, and corresponds to the tooth shape and tooth spacing of the endless toothed belt to be produced, is guided into the intermediate space between the molding sheet 1 and the molding belt 9 through the guiding or lead-in member 17. The unfinished belt 18 which is guided-in rests against the radial side flank of the molding wheel shoulder 11. The strand of synthetic material 23, which is at first in the form of this unfinished belt 18 and which again emerges from the intermediate space, is guided around the tensioning wheel 3 and is again guided into the start of the intermediate space between the molding wheel 1 and the molding belt 9. In this connection, the strand of synthetic material 23, during its return, is deflected or displaced in the axial direction of the molding wheel 1 with the aid of the deflection or deviation rollers 16. Specifically, the amount of displacement corresponds to the width of the unfinished belt 18. Since the side wall 20, which is adjacent to the guiding or lead-in channel 19 of the guiding or lead-in member 17, tapers off, the returned strand of synthetic material 23 rests fully against that side of the continually newly guided-in unfinished belt 18 which faces away from the molding wheel shoulder 11. By heating the hollow molding chamber which is filled up with the guided-in unfinished belt 18, the latter may be softened to such an extent that it may be homogeneously fused with the returned strand of synthetic material 23 which seals the hollow molding chamber at the open side which faces away from the molding wheel shoulder 11. During said softening of the guided-in unfinished belt 18, the reinforcing inserts of the belt 18 are supported by the winding noses or projections 7 of the molding wheel 1 at the required radial distance from the head surfaces of the molding teeth or elevations 6. The unfinished belt 18 which is fused with the returned strand of synthetic material 23 is solidified before leaving the hollow molding chamber by being cooled by the cooling devices 13 and 15. By continually guiding-in the unfinished belt 18 and fusing the same with the returned strand of synthetic material 23, there is produced a reinforced flexible tube or hose which passes around the molding wheel 1 and the tensioning wheel 3. That edge of the hose which faces the molding wheel shoulder 11 continually rolls on the deflection or deviation rollers 16, thereby continually advancing on the molding wheel 1 and the tensioning wheel 3 in the axial direction thereof and laterally exiting from the hollow molding chamber or the arc-shaped intermediate space between the molding wheel 1 and the molding belt 9. Endless toothed belts of any desired width may then be cut off of this reinforced hose. These endless toothed belts thus comprise a continuous reinforcing insert which extends in the circumferential direction of the belt.

Remarkably high production speeds may be achieved with the following particularly advantageous mode of operation. First, a plurality of windings of the unfinished belt 18 are wound around the molding wheel 1 and the tensioning wheel 3 without thereby already softening the guided-in unfinished belt 18 to such an extent that it may be fused to the respective returned winding. In view of the above, high rotational speeds of the molding wheel 1 may be used, so that the windings are wound very quickly. By means of the thereby generated frictional heat in the guiding or lead-in channel 19 of the guiding or lead-in member 17 and, if necessary, by means of an additional heating of the guiding or lead-in member 17, the lateral surface of the guided-in unfinished belt 18 may be softened to such an extent that the guided-in unfinished belt 18 and the previously wound windings are preliminarily fastened together. This fastening together promotes the rapid winding of windings which lie fully against one another. After winding the windings, the heating devices 12 and 14 are turned on and, while the molding wheel 1 is now slowly turned, all windings are simultaneously and jointly plasticized in the hollow molding chamber and are fused together into a tube- or hose-shaped strand of synthetic material. The tube-shaped strand of synthetic material is cooled and solidified by the cooling devices 13 and 15 before the strand leaves the hollow molding chamber. After this tube formation during slow turning of the molding wheel, a plurality of windings of the prefabricated unfinished belt are again wound up at a high rotational speed of the molding wheel 1 while the heating devices 12 and 14 are turned off. This winding up continues until the hollow molding chamber between the molding wheel 1 and the molding belt 9 is again nearly filled up with the windings and as long as the hollow molding chamber still remains sealingly closed from the previously produced reinforced tube at the open side, which faces away from the molding wheel shoulder 11. Afterwards, the fusing of the wound up windings with one another as well as with the previously produced reinforced tube is repeated while the heating devices 12 and 14 are turned on and the molding wheel 1 is slowly turned.

The above described mode of operation pursuant to the present invention allows a remarkably economical continual conversion of a finitely produced toothed belt into an endless toothed belt of any desired circumferential length and comprising an embedded reinforcing insert which extends continuously in the longitudinal direction of the belt.

It is, of course, to be understood that the present invention is by no means limited to the specific showing in the drawings, but also encompasses any modifications within the scope of the appended claims.

What I claim is:

1. A method of making in a continuous process, by means of a hollow molding chamber, endless toothed belts of extrudable synthetic material and of any desired circumferential length from a relatively narrow prefabricated unfinished belt having a pull-resistant reinforcing insert embedded therein and extending substantially in the longitudinal direction thereof, which includes the steps of: continuously guiding successive sections of said unfinished belt into said hollow molding chamber; heating the respective unfinished belt sections which are in said hollow molding chamber to such an extent that they become fusably soft; supporting said reinforcing insert within said hollow molding chamber; solidifying said softened unfinished belt sections, with said reinforcing insert embedded therein, so as to form a strand of synthetic material; withdrawing said strand of synthetic material from said hollow molding chamber; guiding said strand of synthetic material back into said hollow molding chamber contiguous to the respective continuously guided-in unfinished belt sections; heating at least that side of said guided-in strand of synthetic material which is adjacent to said respective continuously guided-in unfinished belt sections to such an extent that at least said last mentioned side becomes fusably soft; fusing said respective unfinished belt sections to said contiguous guided-in strand of synthetic material to form a hose section; cooling said hose section; withdrawing said hose section from said hollow molding chamber; guiding said hose section back into said hollow molding chamber contiguous to the respective continuously guided-in unfinished belt sections; repeating the aforementioned steps until a hose of a desired length is formed; and while continuing the aforementioned steps, periodically cutting off rings from the thus formed hose so as to obtain belts of the desired width.

2. A method of making in a continuous process, by means of a hollow molding chamber, a molding wheel, and a tensioning wheel, endless toothed belts of extrudable synthetic material and of any desired circumferential length from a relatively narrow prefabricated unfinished belt having a pull-resistant reinforcing insert embedded therein and extending substantially in the longitudinal direction thereof, which includes the steps of: continuously and rapidly winding successive sections of said unfinished belt around said molding wheel and said tension wheel while placing successive windings laterally adjacent to one another until said hollow molding chamber is nearly full; considerably reducing the rate at which unfinished belt sections are wound around said wheels; heating said nearly full hollow molding chamber to such an extent that adjacent unfinished belt sections contained therein are fused to one another to form a hose; cooling said hose; repeating the aforementioned steps while periodically cutting off rings from the thus formed hose so as to obtain belts of the desired width.

3. A method according to claim 2, which includes the steps of provisionally interconnecting adjacent unfinished belt sections to one another in said hollow molding chamber prior to said heating of said nearly full hollow molding chamber.

4. A method of producing in a continuous process endless toothed belts of any desired circumferential length and of an extrudable synthetic material from a relatively narrow prefabricated unfinished belt having a pull-resistant reinforcing insert embedded therein and extending substantially in the longitudinal direction thereof, which includes the steps of: creating an arc-shaped hollow molding chamber between a molding drum and a section of an endless molding belt cooperating with an arc-shaped circumferential section of said molding drum while continuously rotating said molding drum together with said molding belt; continuously guiding successive sections of said relatively narrow prefabricated unfinished belt into the sealingly closed start of said molding chamber; heating the respective unfinished belt sections which are in said hollow molding chamber to such an extent that they become fusably soft to provide in said molding chamber a strand of synthetic material having embedded therein said reinforcing insert while supporting said reinforcing insert at a radial distance from the peripheral surface of said molding drum until the solidification of said strand in said molding chamber and prior to leaving the end of said molding chamber; reversing said solidified strand after leaving said molding chamber around a tensioning wheel adjustably distanced from said molding drum back to said molding drum while simultaneously displacing said strand in the axial direction of said molding drum by the width of said guided-in unfinished belt sections and introducing the reversed strand between said molding drum and said section of said endless molding belt directly laterally adjacent said molding chamber and sealingly closing by the introduced strand the open arc-shaped side of said molding chamber facing said introduced strand while sealingly closing the other arc-shaped side of said molding chamber by the cooperating sections of said molding drum and said molding belt; heating at least that side of said introduced strand which is adjacent to said respective continuously guided-in unfinished belt sections to such an extent that at least said last mentioned side become fusably soft and fusing said respective unfinished belt sections to said introduced strand; repeating the thus described steps until a hose has been built which rotates around said molding drum and said tensioning wheel while simultaneously moving on said molding drum and said tensioning wheel in the axial direction thereof; and cutting the thus obtained hose with the helically arranged reinforcing insert embedded therein into belts of the desired width.

* * * * *